Nov. 19, 1935.    W. LAM    2,021,793
AIR LAYERING POT
Filed Dec. 15, 1934
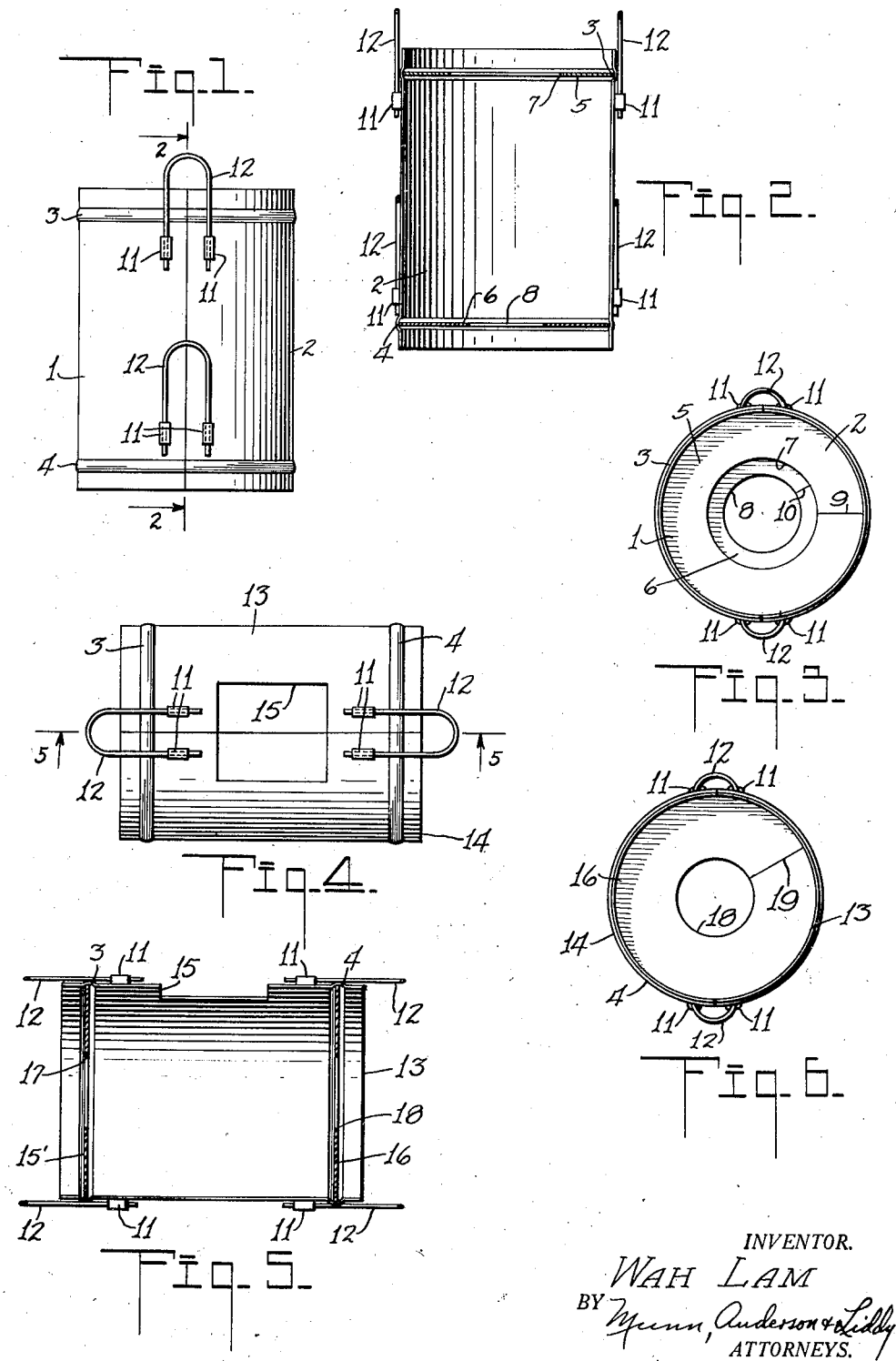
INVENTOR.
WAH LAM Patented Nov. 19, 1935

2,021,793

UNITED STATES PATENT OFFICE 2,021,793

AIR-LAYERING POT

Wah Lam, Honolulu, Territory of Hawaii

Application December 15, 1934, Serial No. 757,737

5 Claims. (Cl. 47—37)

My invention relates to improvements in air-layering pots, and it consists of the combinations, constructions and arrangements hereinafter described and claimed.

An object of my invention is to provide an air-layering pot which is an improvement over my Patents No. 1,774,019 and No. 1,868,609, issued August 26, 1930 and July 26, 1932, respectively. In the first patent I showed a transplanting pot consisting of two removable halves and these halves were removably held together by rings that were slipped on from the smaller end of the pot. In the second patent I showed a device especially designed for air-layering trees, and this consisted of two separable sections held together by staples or collapsible rings.

In the present device I show two separable halves, which when secured together, form a perfect cylinder. The cylinder has an annular groove disposed adjacent to each end, and in this groove I mount disc-like partitions having central openings with a cut extending from the opening to the periphery of the disc. The present device is designed to be used in a vertical position for air-layering purposes or in a horizontal position. When used in a vertical position the upper disc has an opening larger than the opening in the lower disc for the purpose of permitting water to be added to the interior of the cylinder. When the device is used in a horizontal position the two discs have central openings of equal size and an opening is provided in the top wall of the cylinder through which water can be added as required. The purpose of splitting the discs between the opening and the periphery is to permit the discs to be passed around the limbs so as to enclose them. Staples or other suitable fastening means are used for removably securing the two halves of the cylinder together.

Other objects and advantages will appear in the following specification, and the novel features of the device will be particularly pointed out in the appended claims.

My invention is illustrated in the accompanying drawing forming a part of this application, in which Figure 1 is a side elevation of the device when used on vertical limbs of a tree;

Figure 2 is a section along the line 2—2 of Figure 1;

Figure 3 is a top plan view of Figure 1;

Figure 4 is a top plan view of the device when used for air-layering to a horizontal limb;

Figure 5 is a section along 5—5 of Figure 4; and

Figure 6 is an end view of Figure 5.

In carrying out my invention I will first describe the device used on a vertical limb, and then will describe the device used on a horizontal limb. In Figures 1 to 3 inclusive I show the air-layering pot as composed of two halves 1 and 2, and each half is semi-cylindrical in shape. Each half has a groove on its inner surface disposed adjacent to the top and bottom edge of the half, and when the two halves are assembled the grooves of the two halves form a top annular groove 3, and a bottom annular groove 4.

In Figure 2 I show a top partition 5 which is in the shape of a disc and the periphery of this disc is received in the top groove 3. The bottom disc-shaped partition 6 has its periphery received in the bottom groove 4. Figure 3 shows how the top disc 5 has an opening 7, and further shows the bottom disc as having an opening 8. Figure 3 further shows the top disc 5 split at 9, and the bottom disc 6 split at 10.

From the foregoing description of the various parts of the device, the operation thereof may be readily understood.

The device is designed to air-layer any type of branch that extends in a perpendicular or semi-perpendicular direction. The device can be used on branches of trees or plants. In assembling the device to the air-layered portion of the tree, the discs 5 and 6 are first applied to the branch so as to enclose the branch. The branch is passed through the cut portions 9 and 10 of the discs during this operation. The two halves 1 and 2 are now assembled to the discs 5 and 6, and then the staples 12 are secured in place. The completed device will take the appearance as shown in Figure 1. Earth or other material may be used for binding purposes. Water may be added as needed through an enlarged opening 7, and after the air-layering has been accomplished, the device may be removed without interfering with the tree or plant.

In the form of the device shown in Figures 4 to 6 inclusive, the construction is identical with the exception that the halves 13 and 14 have recesses in their sides forming an opening 15 when the two halves are assembled. The other change consists of the provision of two discs or partitions 15' and 16 which are identical in size and shape, and which have openings 17 and 18 of the same size. The discs 15' and 16 have radially extending cuts as shown at 19 in Figure 6. The sleeves and the staples are the same as shown in Figures 1 to 3, and therefore similar reference numerals will be applied.

This form of the invention can be used for layering horizontal or semi-horizontal branches of trees or plants. The opening 15 in the side permits water to be added as required. The partitions 15' and 16 enclose the limb in the manner already described, and then the halves 13 and 14 are applied to the partitions and are secured in place by the staples 12 being removably received in the sleeves 11. In this form of the device earth or other material may be used for binding purposes, and after the air-layering has been accomplished the device can be removed without interfering with the tree or the plant.

The device is extremely simple in construction and is durable and efficient for the purpose intended.

While I have shown only the preferred forms of my invention, it should be understood that various changes or modifications may be made within the scope of the appended claims without departing from the spirit of the invention.

I claim:

1. A layering pot comprising two semi-cylindrical parts designed to abut each other for forming a cylinder, means removably securing the two parts together, and discs removably secured to the ends of the pot and each disc having a centrally disposed opening.

2. A layering pot comprising two semi-cylindrical parts designed to abut each other for forming a cylinder, means removably securing the two parts together, and discs removably secured to the ends of the pot and having centrally disposed openings, said discs having slits extending from the central opening to the periphery.

3. A cylindrical layering pot comprising two separable semi-cylindrical halves, the halves having arcuate grooves disposed adjacent to the ends, and forming annular grooves when the halves are assembled, discs having their peripheries received in the annular grooves, said discs having central openings with slits extending from the openings to the peripheries, and means for removably securing the halves together.

4. A cylindrical layering pot comprising two separable semi-cylindrical halves, the halves having arcuate grooves disposed adjacent to the ends, and forming annular grooves when the halves are assembled, discs having their peripheries received in the annular grooves, said discs having central openings with slits extending from the openings to the peripheries, and means for removably securing the halves together, the pot when used in a vertical or semi-vertical position having its upper disc provided with an opening larger than the opening in the lower disc.

5. A cylindrical layering pot comprising two separable semi-cylindrical halves, the halves having arcuate grooves disposed adjacent to the ends, and forming annular grooves when the halves are assembled, discs having their peripheries received in the annular grooves, said discs having central openings with slits extending from the openings to the peripheries, and means for removably securing the halves together, the pot having an opening in its side for permitting the pot to be used in a horizontal position or a semi-horizontal position.

WAH LAM.